Aug. 17, 1937.  E. P. WEBSTER  2,090,275
BELT COUPLING
Filed May 5, 1936
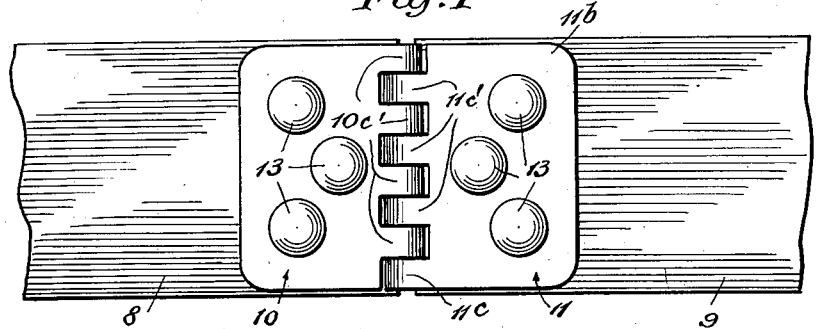
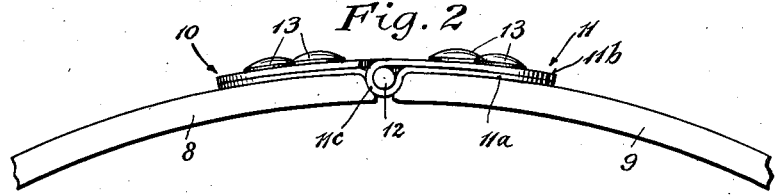
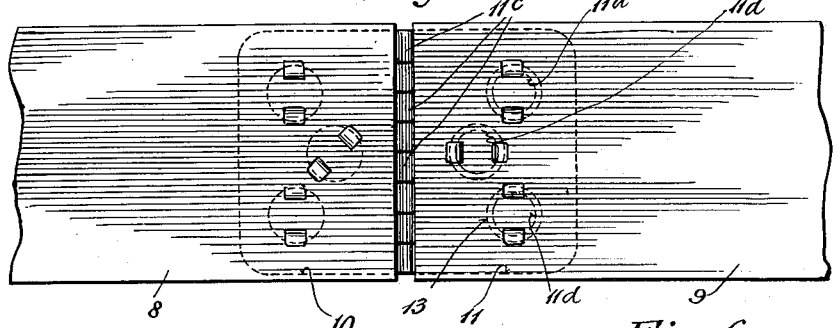
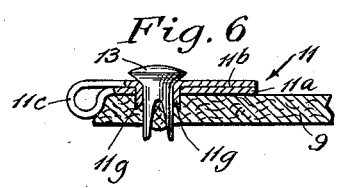
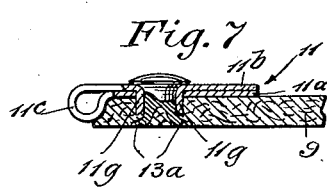
INVENTOR
Edgar P. Webster,
BY
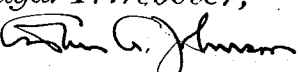
ATTORNEY Patented Aug. 17, 1937

2,090,275

UNITED STATES PATENT OFFICE 2,090,275

BELT COUPLING

Edgar P. Webster, Bridgeport, Conn.

Application May 5, 1936, Serial No. 77,901

12 Claims. (Cl. 24—33)

This invention relates to belt fasteners, and more particularly to belt fasteners of the type including a pair of hingedly connected metal plates to be secured to the end portions of belt lengths to be coupled by the fastener.

It has been heretofore proposed to secure such plates to the belt portions to which they are to be fastened, by screws, rivets, or other piercing elements non-integral with the plates, these elements piercing the belt in such manner that weakeningly large parts of the belt material are removed.

According to the present invention, in order to avoid the disadvantage last-mentioned, and also to allow soft metal and extremely light-weight rivets to be used, so that they will have merely a positioning rather than a load-taking function in the coupling assembly, there are employed, in combination with these soft metal and extremely light-weight rivets, hard steel plates which integrally carry struck-out prongs for partially entering the belt at spaced points along a line circumferential of an area of rivet application. These plates are desirably of very hard steel, such as black or hot-rolled steel; the sheets or strips of such steel used being recommended to be of a thickness of the order of $\frac{1}{16}''$ for even very thick and wide belts, as it has been found that then the prongs can take the whole pull of the belt although sent into the latter to a depth less than one-half the thickness of the belt. Such a slight penetration of the belt by the prongs, and the fact that according to the present invention all the prongs of each circumferential series thereof have spaces therebetween of as great area as the prongs themselves, and the further fact that according to the present invention the prongs are all of substantially precisely the same length, prevent any deleterious localized weakening of the leather or other material of which the belt is made.

Further according to the invention, each of the plates carrying these prongs is of double thickness, being made of a single strip of hard steel folded over on itself. Such a plate provides, beyond the end thereof carrying the fold, a double-leaf sheet member of hard steel. In one of these leaves, that one to be laid against the belt, circular apertures of comparatively large size are provided, and from the other of these leaves the prongs are formed in the circumferential series aforesaid by punching out circular apertures of less diameter than the circular apertures of the belt-contacting leaf while breaking and forming the metal of the outlying leaf punched to establish the smaller apertures in such manner that the metal at each of these apertures establishes one of said circumferential series of prongs. A plurality of these prong-forming apertures are provided in the outlying leaf, and each of said apertures is of such size that the prongs, which at their outer surfaces and near their root portions are arcuate, snugly fit the matching apertures in the belt-adjacent leaf, to brace the prongs in their work of assuming the belt load. Due, however, to the comparatively large size of the prong-forming apertures, and the fact that the soft metal rivets, which are desirably of copper, are of the slit-shank type, the thin riveting prongs thereby established, although they go all the way through the belt in order that their free ends may be clinched over, also avoid the giving of any deleterious localized weakenings to the leather or other material of which the belt is made.

The functioning of these light-weight rivets, therefore, is merely to hold each plate against the belt portion seized by the load-taking, partially penetrating, comparatively wide spaced, and uniformly long, steel prongs.

The two plates are hinged together by a suitable pintle pin, such pin being sent through spaced aligning collar elements carried by both plates at the folded ends thereof; these collar elements being staggered on one plate relative to those on the other plate, so that such elements on one plate fit between such elements on the other plate. Before a steel plate is folded over to form the double-leaf plate, material is removed from the blank to provide for the inter-collar spaces to be present in the finished plate.

An important object of the invention is to provide double-ply plates formed and hinged together as last-above described, and with each plate carrying projections, preferably in the form of integral prongs, for only partially penetrating the belt yet taking all the belt-load because held to such penetration by positioning rivets, and at the same time to provide an arrangement of parts such that relative shift of the two leaves of a plate is prevented. Such relative shift must be prevented in order to protect the comparatively fragile rivets against shearing. Yet there is a strong tendency for such leaves to shift relatively in response to belt-load, due to a tendency then of the collar elements aforesaid to flatten out in the direction of belt extension and to sway and deform toward symmetrical extension on opposite sides of the plane of the belt. This aim of the invention is accomplished by forming the prongs from the material of the outlying leaf of each plate incidental to providing keepers for said projections, preferably by punching circular apertures in that leaf as hereinabove described, and by keying said outlying leaf to the other or belt-adjacent leaf by snugly fitting such prongs in circular apertures of the proper size in the belt-adjacent leaf, also as hereinabove described.

The invention will be more clearly understood from the following description of an exemplifying embodiment of the invention as now preferred and as shown in the accompanying drawing, in which:

Figure 1 is what may be termed a top plan view of said embodiment as attached to two belt portions to be coupled thereby.

Fig. 2 is a side elevation with the parts shown in Figure 1.

Fig. 3 is a bottom plan view thereof.

Fig. 4 is a longitudinal section taken through one of the plates after being stamped and folded in readiness for formation of the prongs to be struck from the outlying leaf for extension through and protrusion beyond the belt adjacent leaf.

Fig. 5 is a view similar to Fig. 4, showing said plate as finally fabricated.

Fig. 6 is a view similar to Figs. 4 and 5, showing the finished plate applied to a belt portion and also showing a copper rivet piercing the plate but not yet clinched over.

Fig. 7 is a view similar to Fig. 6, showing the rivet as finally applied.

Referring to the drawing in detail:

The two belt lengths to be joined are indicated at 8 and 9.

The coupling shown comprises a plate 10 for securement to the belt 8, a plate 11 for securement to the belt 9, a pintle pin 12 for hinging the plates together, and a plurality of positioning rivets 13.

As shown best in Figs. 4 to 7, the plate 11 is formed from a strip of sheet metal, desirably hard steel, folded over on itself to provide a belt-adjacent leaf 11a and an outlying leaf 11b. Such fold is established as a tubular structure 11c substantially circular in cross-section with such circle asymmetral relative to the thickness of the plate.

Before the steel strip or blank is folded over to form such a double-leaf plate, material is removed from the blank so that when the plate is folded over and formed as illustrated and just described, the tubular structure 11c will be broken up into a line of collar elements marked 11c' in Figure 1 and having spaces therebetween as wide as said elements are wide.

Both plates are similarly fabricated, in all particulars; except that the collar elements 11c' of the plate 11, and the corresponding elements 10c' of the plate 10, are staggered relative to each other, so that the coupling can be assembled and hinged together by insertion of the pintle 12 as in Figures 1, 2 and 3.

Also before each blank is folded over to form its double-leaf plate, that part of the blank to become the plate-adjacent leaf thereof is apertured at a plurality of points, in the present case three points, so as to have such apertures located as indicated, in the case of the plate 11, by the broken line circles 11d seen in Fig. 3. Simultaneously with the punching of these apertures, small openings are punched through that part of the blank to become the outlying leaf of said plate. These holes are so located that when the blank is folded to form the plate, each of said holes will be concentric with one of the apertures in the blade-adjacent leaf. Such an aperture and such a hole are shown, respectively, at 11d and 11e in Fig. 4.

When a plate has been formed to the extent shown in Fig. 4 and as above described, it is next submitted to a punching and forming operation, whereby each of the annular subdivisions of the metal of the overlying leaf which surrounds one of the openings therein, is slit along radial lines equidistantly spaced around the hole and said metal subdivision is drawn downward to and through the aperture therebelow in the plate-adjacent leaf. Thereby, the holes in the outlying leaf become transformed into apertures concentric with the apertures in the belt-adjacent leaf, and at each of these pairs of concentric apertures the metal of the outlying leaf between the radial lines just mentioned, is sent through the underlying aperture in the belt-adjacent plate to establish uniformly long and uniformly shaped steel prongs. In Fig. 5, the aperture into which one of these holes is thus transformed is shown at 11f, and the steel prongs which are formed incidental to such transformation are shown at 11g. These prongs, it will be noted, are widely spaced, substantially to an amount equal to the area of a prong, and, due to the preliminary provision of the hole 11e, are substantially of precisely the same length.

As will be seen from Fig. 6, when a plate is flatwisely applied to a belt length, these prongs, due to the double-leaf construction of the plate, penetrate the belt material only to the extent of about one-half the thickness of the belt, while at the same time the apertures circumscribed by each circular series of prongs is of considerable diameter. Consequently, when the split shank rivets 13 are sent through these apertures, the shank tines which pass through a part of the thickness of the belt as shown in Fig. 6, to be finally clinched over at their free ends 13a as shown in Figs. 7 and 3, are widely spaced at the underside of the belt. Thus, although these rivet shanks pierce the belt, such piercings result in negligible localized weakenings of the belt.

Referring to Fig. 2, it will be seen that the tubular hinge-forming structure receiving the pin 12 is roofed over by substantially straight prolongations of the leaf 11b and of the corresponding leaf of the plate 10, and that the bottom wall portion thereof is curved sharply downward away from the leaf 11a and from the corresponding leaf of the plate 10. This asymmetry of said structure relative to the plane of the coupling is for the purpose of having the pin 12 located below said plane. There would ordinarily be a strong tendency of said tubular structure to straighten out and move upwardly during heavy belt-loads and while the belt is travelling at a high speed, but this is absolutely prevented because of the keying together of the two leaves of each plate by the extension of the prongs of the outlying leaf through the apertures in the belt-adjacent leaf and by the snug fit of each circularly arranged set of such prongs in an aperture of the last-mentioned leaf. Thus the comparatively fragile rivets 13, whose function is solely to hold the coupling against the belt lengths tightly to maintain the steel prongs to partial penetration of the belt material, are absolutely protected against shearing.

Variations and modifications may be made within the scope of this invention, and portions of the improvements may be used without others.

I claim:

1. A belt coupling of the hinge-type having two hinge-leaves each including a pair of superposed hard metal plates integrally united at one end by loops, and a pintle extended through said loops to provide a hinge connection between said leaves, one of said plates of each leaf having an aperture, and the other plate of each leaf having an integral projection extending into the aperture of the apertured plate of that leaf to interlock the two plates against sliding relatively over each other under strains tending to cause such movement.

2. A belt coupling of the hinge-type having two hinge-leaves each including a pair of superposed hard metal plates integrally united at one end by loops, and a pintle extended through said loops to provide a hinge connection between said leaves, one of said plates of each leaf having an aperture, and the other plate of each leaf having a group of integral prongs offset therefrom and fitting into and extending through the aperture in the apertured plate of that leaf to interlock the two plates against sliding relatively over each other under strains tending to cause such movement and to penetrate the end of the belt when the leaf is secured thereto by a rivet extending through said aperture.

3. A belt coupling as defined in claim 2, in which the prongs are substantially arcuate transversely and are substantially circularly arranged to establish between them a substantially circular aperture in the plate from which they are struck, and to define through both plates a substantially cylindrical opening of a size to snugly receive the rivet by means of which the leaf is secured to the end of the belt.

4. A belt coupling as defined in claim 2, in which the prongs are limited in length so as to penetrate the end of the belt only partially.

5. A belt coupling as defined in claim 2, in which the prongs are of substantially uniform length and shape and are of such length that the prongs will penetrate the end of the belt only partially.

6. A belt coupling incorporating a leaf including a first hard metal plate and a second hard metal plate superposed on the first plate, said second plate having apertures, and said first plate having integral projections each of which is extended into and through and below a different one of said apertures in the second plate.

7. A belt coupling incorporating a leaf including a first hard metal plate and a second hard metal plate superposed on the first plate, said second plate having apertures, and said first plate having integral projections each of which is extended into and through and below a different one of said apertures in the second plate, said plates being integrally united at an edge of the leaf.

8. A belt coupling incorporating a leaf including a first hard metal plate and a second hard metal plate superposed on the first plate, said second plate having apertures, and said first plate having integral projections each of which is extended into and through and below a different one of said apertures in the second plate, said apertures being substantially circular, said first plate also having apertures and said projections including substantially cylindrical tubular portions surrounding the apertures last-mentioned and snugly fitting in the apertures in the second plate.

9. A belt coupling incorporating a leaf including a first hard metal plate and a second hard metal plate superposed on the first plate, said second plate having apertures, and said first plate having integral projections each of which is extended into and through and below a different one of said apertures in the second plate, said apertures being substantially circular, said first plate also having apertures and said projections including substantially cylindrical tubular portions surrounding the apertures last-mentioned and snugly fitting in the apertures in the second plate, said plates being integrally united at an edge of the leaf.

10. A belt coupling incorporating a leaf including a first hard metal plate and a second hard metal plate superposed on the first plate, said second plate having apertures, and said first plate having integral projections each of which is extended into and through and below a different one of said apertures in the second plate, said apertures being substantially circular, said first plate also having apertures and said projections including substantially cylindrical tubular portions surrounding the apertures last-mentioned and snugly fitting in the apertures in the second plate, said tubular portions at their lower ends carrying a circumferential series of prongs projected below the bottom of the first plate.

11. A belt coupling incorporating a leaf including a first hard metal plate and a second hard metal plate superposed on the first plate, said second plate having apertures, and said first plate having integral projections each of which is extended into and through and below a different one of said apertures in the second plate, said apertures being substantially circular, said first plate also having apertures and said projections including substantially cylindrical tubular portions surrounding the apertures last-mentioned and snugly fitting in the apertures in the second plate, the apertures in the first plate and said tubular portions providing passages for rivets through both plates by which the leaf may be secured to belt material below the first plate, said tubular portions at their lower ends carrying downwardly directed prongs projected below the bottom of the first plate for partial penetration of said belt material.

12. A belt coupling incorporating a leaf including a first hard metal plate and a second hard metal plate superposed on the first plate, said second plate having apertures, and said first plate having integral projections each of which is extended into and through and below a different one of said apertures in the second plate, said apertures being substantially circular, said first plate also having apertures and said projections including substantially cylindrical tubular portions surrounding the apertures last-mentioned and snugly fitting in the apertures in the second plate, the apertures in the first plate and said tubular portions providing passages for rivets through both plates by which the leaf may be secured to belt material below the first plate, said tubular portions at their lower ends carrying downwardly directed prongs projected below the bottom of the first plate for partial penetration of said belt material, said plates being integrally united at an edge of the leaf.

EDGAR P. WEBSTER.